US008783395B2

(12) United States Patent
Sauvlet et al.

(10) Patent No.: US 8,783,395 B2
(45) Date of Patent: Jul. 22, 2014

(54) METHOD AND APPARATUS FOR STARTING AN INTERNAL COMBUSTION ENGINE IN A HYBRID VEHICLE DRIVE

(75) Inventors: Nils Sauvlet, Bad Essen (DE); Marco Fleckner, Leonberg (DE); Markus Goehring, Nufringen (DE); Dieter Kraxner, Wurmberg (DE)

(73) Assignee: Dr. Ing. h.c. F. Porsche Aktiengesellschaft (DE)

( * ) Notice: Subject to any disclaimer, the term of this patent is extended or adjusted under 35 U.S.C. 154(b) by 435 days.

(21) Appl. No.: 11/942,170

(22) Filed: Nov. 19, 2007

(65) Prior Publication Data
US 2008/0129049 A1 Jun. 5, 2008

(30) Foreign Application Priority Data
Nov. 21, 2006 (DE) .......................... 10 2006 054 740

(51) Int. Cl.
B60K 6/387 (2007.10)
B60W 10/02 (2006.01)
B60W 10/06 (2006.01)

(52) U.S. Cl.
USPC .......................... 180/65.28; 903/946; 701/48

(58) Field of Classification Search
USPC ............. 701/48; 180/65.265, 65.28; 903/930, 903/946
See application file for complete search history.

(56) References Cited

U.S. PATENT DOCUMENTS

| 3,695,098 | A | * | 10/1972 | Kirkland, Jr. .............. 73/116.01 |
| 3,960,123 | A | * | 6/1976 | Berninger ..................... 123/392 |
| 4,313,080 | A | * | 1/1982 | Park ............................. 320/123 |
| 4,671,138 | A | * | 6/1987 | Nobumoto et al. ............. 701/65 |
| 4,913,260 | A | * | 4/1990 | Fallon ........................... 181/254 |
| 5,495,127 | A | | 2/1996 | Aota et al. |
| 5,589,743 | A | * | 12/1996 | King .............................. 318/139 |
| 5,818,116 | A | | 10/1998 | Nakae et al. |
| 6,059,064 | A | * | 5/2000 | Nagano et al. ................ 180/243 |
| 6,176,807 | B1 | * | 1/2001 | Oba et al. ........................ 477/5 |
| 6,247,437 | B1 | * | 6/2001 | Yamaguchi et al. ....... 123/179.3 |
| 7,214,110 | B1 | * | 5/2007 | Ehlers et al. ..................... 440/1 |
| 2003/0089538 | A1 | | 5/2003 | Boggs et al. |
| 2003/0153429 | A1 | | 8/2003 | Boll |
| 2004/0112653 | A1 | | 6/2004 | Boggs et al. |
| 2005/0082098 | A1 | * | 4/2005 | Ito et al. ....................... 180/65.2 |
| 2006/0137921 | A1 | | 6/2006 | Colvin et al. |
| 2007/0056783 | A1 | * | 3/2007 | Joe et al. ...................... 180/65.2 |

(Continued)

FOREIGN PATENT DOCUMENTS

DE  44 30 650 A1  3/1995
DE  199 57 269 A1  6/2000

(Continued)

OTHER PUBLICATIONS

"Frequencies for equal-tempered scale", http://www.phy.mtu.edu/~suits/notefreqs.html, retrieved Aug. 15, 2011, 4 pages.*

Primary Examiner — Frank Vanaman
(74) Attorney, Agent, or Firm — Gerald E. Hespos; Michael J. Porco; Matthew T. Hespos

(57) ABSTRACT

A method is employed for starting an internal combustion engine in a hybrid vehicle drive which is driven by an electric motor. A speed of the internal combustion engine is adjusted to a target speed. The internal combustion engine speed exceeds the target speed over a predefined time by a predetermined speed differential.

10 Claims, 3 Drawing Sheets

(56) References Cited

U.S. PATENT DOCUMENTS

| | | |
|---|---|---|
| 2007/0157899 A1 | 7/2007 | Seufert et al. |
| 2008/0182722 A1 | 7/2008 | Colvin et al. |
| 2010/0024756 A1 | 2/2010 | Seufert et al. |
| 2010/0031910 A1 | 2/2010 | Seufert et al. |
| 2010/0106394 A1 | 4/2010 | Seufert et al. |

FOREIGN PATENT DOCUMENTS

| | | |
|---|---|---|
| DE | 101 58 536 A1 | 7/2003 |
| DE | 10 2004 020 110 A1 | 11/2005 |
| DE | 20 2005 019 996 U1 | 4/2006 |

* cited by examiner

METHOD AND APPARATUS FOR STARTING AN INTERNAL COMBUSTION ENGINE IN A HYBRID VEHICLE DRIVE

BACKGROUND AND SUMMARY OF THE INVENTION

The present invention relates to a method and a device for starting an internal combustion engine in a hybrid drive of a vehicle.

For several years vehicles with so-called hybrid drives have existed as energy saving and environmental friendly alternatives to conventional internal combustion engines. A hybrid drive is usually defined as the combination of a number of different drive principles or the combination of a number of different energy sources for the respective type of drive. Therefore, a hybrid drive generally exhibits two different energy converters and two different energy accumulators. With very few exceptions, the practical implementation of the energy converters involves an internal combustion engine and an electric motor, and the energy accumulators involve a combustible fuel and a battery.

In a vehicle with a hybrid drive, both the internal combustion engine and the electric motor can be operated in a respectively optimal efficiency range. Excess energy, for example when braking or during passive coasting, is used via a generator for charging the battery.

When accelerating, the internal combustion engine and the electric motor usually work together, so that, in comparison to a typical internal combustion engine, a smaller one can be used. Since an internal combustion engine can deliver a high torque especially in a higher speed range, the provided electric motor is more suitable especially when starting from standstill, because it can provide a maximum torque even at low speeds. Therefore, at certain driving dynamics, both the engine and the motor can be started and stopped in order to achieve a driving mode that exhibits optimal energy consumption at high efficiency.

Especially when starting from a standstill or, for example, when accelerating after slowly driving through a tight curve, the electric motor is more suitable for accelerating. When then accelerating to a moderate speed or as far as up to a high speed, the internal combustion engine exhibits good efficiency. Therefore, the internal combustion engine is started as a function of the respective driving situations and is coupled, for example, by a clutch to the electric motor provided in the vehicle drive train.

For example, when braking or coasting, the electric motor acts as a generator and charges the battery in a corresponding recuperation phase. Usually hybrid vehicles are provided with an automatic transmission that is controlled by a control unit for obtaining the best possible efficiency for the conversion of potential electric or chemical energy into kinetic energy.

When starting the internal combustion engine, the electric motor is used as the starter. After a brief movement of the internal combustion engine the ignition is started. Then both the electric motor and the internal combustion engine must be adjusted to a common speed. Frequently the noises generated in engaging the individual drive possibilities are perceived by the driver as irritating.

Therefore, an object of the present invention is to provide an improved method for starting an internal combustion engine in a vehicle hybrid drive.

The method for starting an internal combustion engine in a vehicle hybrid drive and/or the corresponding device in accordance with the present invention exhibits the advantage that a brief overshooting of the target speed for the internal combustion engine generates a characteristic noise that is often acquainted with known vehicles. The result is an enhanced driving comfort.

According to the invention, a corresponding speed overswing beyond the target speed, which is, for example, the current speed of the electric motor, is produced. By specifying the corresponding speed differential and the length of the overswing by a predefined time period, the acoustical effect in starting the internal combustion engine can be precisely set. The resulting corresponding sound characteristics may be chosen, for example, so that they remind the driver of the starting of a sports engine.

In a contemplated variation of the inventive method, the following method steps are carried out:
 monitoring at least one start criterion for starting the internal combustion engine;
 coupling the internal combustion engine to the electric motor;
 igniting the internal combustion engine; and
 adjusting the speed of the internal combustion engine in such a manner that the speed exceeds over a predefined period of time and by a predetermined speed differential the target speed for generating the speed overswinger.

Start criteria for switching on and coupling the internal combustion engine to the drive train of a corresponding vehicle are, for example, the typical vehicle dynamics such as an acceleration driving mode at a moderate or high speed, long trips at a moderate or high speed, during which the internal combustion engine exhibits better efficiency than the electric motor, or, for example, a critical charge state of the battery for the electric motor. The internal combustion engine is coupled to the electric motor, or, for example, by a controllable mechanical clutch.

Preferably upon reaching a maximum speed, which is equal to the sum of the target speed and the speed differential, the speed of the internal combustion engine is adjusted back to the target speed, preferably the current speed of the electric motor.

In a currently preferred embodiment of the inventive method, the combustion engine and the electric motor are coupled together in a connecting phase by a (e.g., mechanical) clutching device. In so doing, the coupling strength for generating the speed overswing is temporarily reduced before reaching the target speed. Thus, the internal combustion engine can temporarily at a higher speed on the engine motor.

The speed differential ranges preferably from 200 to 500 revolutions per minute; and the preferred period to time ranges, for example, from 0.5 to 1 second. Preferably while starting the internal combustion engine, a gear change of a hybrid vehicle transmission is suppressed. In an especially preferred embodiment of the method, the target speed is exceeded as a function of the selector switch. Thus, it is possible for the driver to prevent in accordance with his needs a speed overswing when starting the internal combustion engine.

The device for connecting an internal combustion engine to an electric motor-driven hybrid vehicle drive includes:
 torque converter for coupling the vehicle drive with a transmission of the hybrid vehicle,
 a clutching device for coupling the electric motor with the internal combustion engine; and
 an engine control unit, that carries out a corresponding method for starting an internal combustion engine in the vehicle hybrid drive.

Furthermore, there is preferably a selector switch for suppressing the speed overswing.

BRIEF DESCRIPTION OF THE DRAWINGS

Other objects, advantages and novel features of the present invention will become apparent from the following detailed description of the invention when considered in conjunction with the accompanying drawings, in which.

DETAILED DESCRIPTION OF THE DRAWINGS

Figure 1:
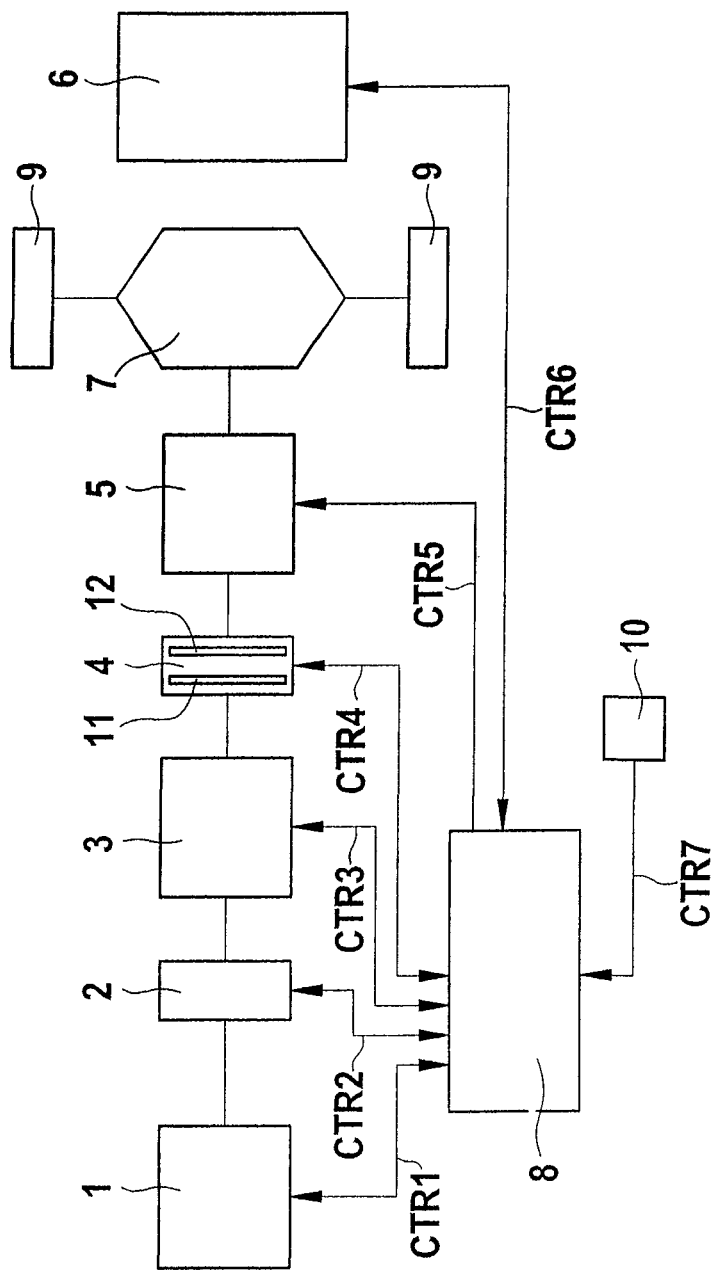
FIG. 1 is a block diagram of a hybrid vehicle drive having a device for starting the internal combustion engine in accordance with the present invention

In FIG. 1, the drive train consists of an internal combustion engine 1, an electric motor 3 (which is also referred to as an electric machine), an automatic transmission 5, and the wheels 9, driven by way of a suitable articulated shaft 7. A mechanical disengageable clutch 2 is provided between the internal combustion engine 1 and the electric motor 3; and a torque converter 4 is provided between the electric motor 3 and the automatic transmission 5. A battery 6 serves as the energy accumulator for the electric motor 5.

Furthermore, the hybrid drive has an engine control unit 8 that receives measurement and/or control signals CTR1-CTR6 from the aforementioned elements and/or generates control signals for the internal combustion engine 1, the disengageable clutch 2, the electric motor 3, the torque converter 4, the automatic transmission 5 and the battery 6. Furthermore, the engine control unit 8 may receive control signals CTR7 from a selector switch 10, thus determining the characteristics for connecting the internal combustion engine 1 to the drive by way of the electric motor 3.

For example, in the event of a total electric drive of the corresponding vehicle, the disengageable clutch 2 between the electric motor 3 and the internal combustion engine 1 is opened, so that the wheels 9 are driven only by the electric motor 3 via the torque converter 4 and the automatic transmission 5. The torque converter 4 is, for example, a hydrodynamic torque converter comprising a pump impeller 11 that is driven by the electric motor, and a turbine blade 12 that is coupled, for example, to the automatic transmission 5 by a shaft. In FIG. 1, the pump impeller 11 and turbine blade 12 are shown schematically.

In such a torque converter, the mechanical energy of the motor is converted by the pump impeller 11 into flow energy inside the torque converter and then converted again into mechanical energy by reversing the turbine blade 12.

Figure 2A:
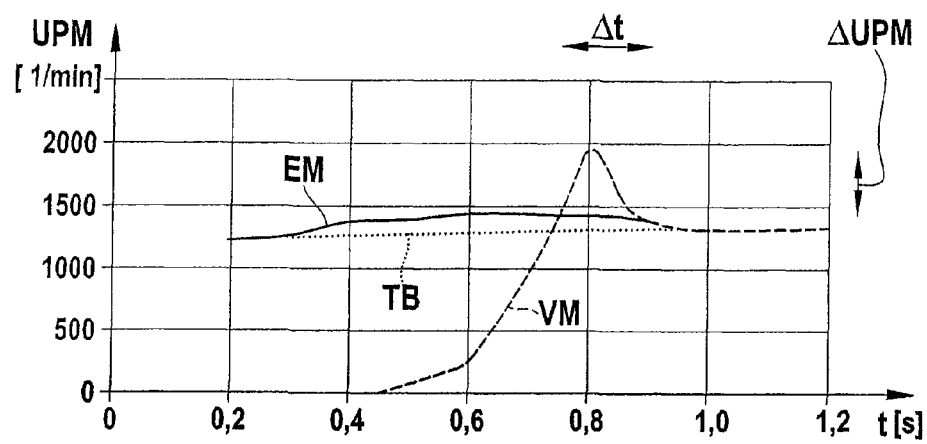
FIGS. 2A and 2B are speed and torque diagrams, respectively, for the variables occurring during the inventive method.
Figure 2B:
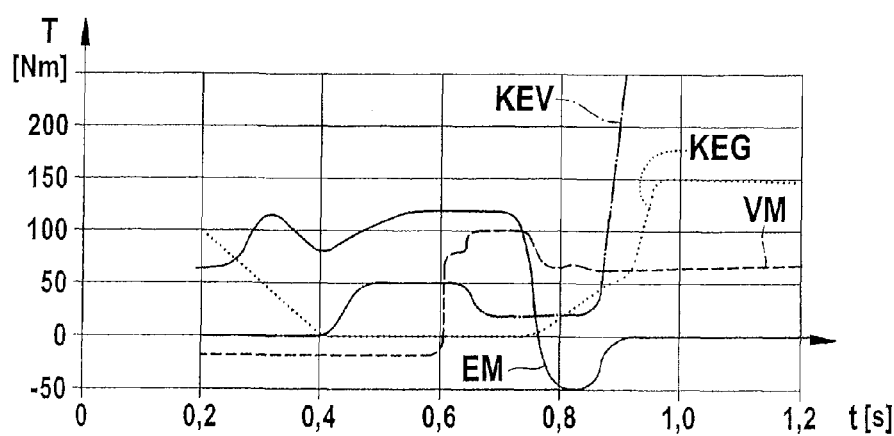

The engine control unit 8 carries out the inventive method (which is explained in more detail in particular with reference to FIGS. 2A and 2B) for connecting the internal combustion engine 1 to the electric motor 3 during the drive mode.

In FIGS. 2A and 2B, the speed (UPM) and the torque (T) are plotted as a function of time. The graphs show a total time range t of approximately 1.2 seconds, during which the internal combustion engine 1 is connected to the running electric motor 3. In FIG. 2A, the solid curve EM describes the speed of the electric motor 3; the dotted curve TB shows the speed of the turbine blade 12 in the torque converter 4; and the dashed curve VM shows the speed of the internal combustion engine 1. In FIG. 2B the solid curve EM shows the torque of the electric motor 3; the dotted curve KEG shows the torque of the clutch between the electric motor 3 and the transmission 5; and the dashed-dotted line KEV shows the torque of the clutch 2 between the internal combustion engine 1 and the electric motor 3.

During the engine starting process, the engine control unit 8 tests a plurality of start criteria for starting the internal combustion engine 1, such as the charge state of the battery 6, the current speed, the torque limits of the electric machine (the electric motor 3) that is in service or other variables that determine the driving dynamics. The engine control unit 8 decides by way of known algorithms that the internal combustion engine 1 must be started.

In starting the internal combustion engine 1, the first step is to suppress a gear change by way of the transmission 5. Therefore, the gear that is currently engaged is fixed. This is done, for example, between the time t=0.25 seconds up to at least t=0.85 seconds.

At time t=0.25 it is determined that the internal combustion engine must be started, because it is demanded by the present driving dynamics.

Then the oil pressure in the torque converter 4 is decreased. This reduction makes possible a speed differential between the pump impeller 11 and/or the speed EM of the electric motor 3 and the speed TB of the turbine blade 12. This occurs between t=0.25 seconds up to t=0.3 seconds. Then the pressure is held constant between t=0.3 seconds and t=0.75 seconds, so that the speed EM of the pump impeller or the electric motor is slightly different from the speed TB of the turbine blade 12. Other adjustment means for the torque converter 4 are also contemplated such as a variable setting of a stator in the torque converter 4.

Up to time t=0.4 seconds, the clutch 2 between the electric motor 3 and the internal combustion engine 1 experiences no torque, as can be observed from FIG. 2B.

Starting at approximately 0.45 seconds, the coupling strength KEG of the clutching device 2 increases to 50 Nm, which becomes apparent in the increase in the speed VM of the internal combustion engine 3.

In the phase between 0.45 seconds and 0.6 seconds, the electric motor 3 acts as the starter for the internal combustion engine 1. The result is the increasing torque EM of the electric motor 3 during this time segment.

At time 0.6 seconds the engine control unit 8 ignites the internal combustion engine 1 so that it starts up. Therefore, the speed VM quickly increases between 0.6 seconds and 0.75 seconds. Usually the speed EM of the electric motor 3 is specified as the target speed (thus, approximately 1,490 revolutions per minute).

According to the invention, the engine control unit 8 achieves a speed overswinger. That is, a short-term overshooting of the aforementioned target speed takes by way of the internal combustion engine speed VM in order to give the driver an especially pleasant feeling while driving.

To this end, the coupling strength KEV of the clutch 2 between the electric motor 3 and the internal combustion engine 1 is decreased after time t=0.65 seconds to approximately t=0.85 seconds. In this time period, the engine control unit 8 adjusts the speed VM by a predetermined speed differential ΔUPM beyond the target speed of approximately 1,490 revolutions per minute. Upon reaching this maximum speed, which is made up of the sum of the target speed of the electric motor and the speed differential ΔUPM, the engine control unit 8 adjusts the speed VM of the internal combustion engine 1 back to the target speed EM of the electric motor 3. For the speed overswing, the result is, as shown in FIG. 2A, a region between the intersecting curves for the speed EM of the electric motor 3 with the speed VM of the internal combustion engine 1.

After "swinging back" or rather upon reaching the target speed EM after the speed overswinger, the coupling strength KEG of the clutching device 2, provided between the internal combustion engine 1 and the electric motor 3, is increased in order to continue simultaneously the driving mode of the hybrid vehicle with both drives (internal combustion engine and electric machine).

It is also contemplated that after adjusting the internal combustion engine 1 to the target speed EM of the electric motor 3, the electric motor 3 no longer generates any additional torque EM, as shown in FIG. 2B after approximately t 0.9 seconds. Then at this stage the internal combustion engine 1 provides for a somewhat uniform torque VM of approximately 70 Nm in the illustrated example here.

The inventive adjustment of the internal combustion engine speed for a short period of time above the speed of the electric motor 3 results in the driver perceiving that the motor is roaring in a sporty manner. This is especially advantageous especially in sporty vehicles and imparts to the driver a familiar feeling about the vehicle even in the vehicle hybrid mode which has a tendency to be unsporty. The specific noise of the speed overswinger can be modelled by adapting the time $\Delta t$ and the speed differential $\Delta UPM$.

Even the type of noise can be programmed, for example, into the engine control unit 8, so that a motor noise, which is especially pleasant to the driver, and driving noise is generated.

For example, the torque output of the internal combustion engine 1 can be used as the triggering criterion for the speed overswinger. This torque output follows from the curve VM. After a certain torque, the coupling strength 2 between the electric motor 3 and the internal combustion engine 1 is then reduced, so that the speed VM of the internal combustion engine may shoot beyond that of the electric motor 3. Other triggering criteria for the speed overswinger are a time control, such as a certain time range following the ignition of the internal combustion engine or a monitoring of the speed of the internal combustion engine and the electric motor. Then a corresponding engine control unit 8 can be programmed in such a manner that the result is a speed overswinger.

Furthermore, a device according to the present invention permits the respective speed overswinger to be suppressed by changing the switch setting 10. For example, it is contemplated that by merely operating the selector switch 10 (also referred to as the sports button), a sporty engagement and start behavior of the internal combustion engine in the electric mode occur.

Figure 3A:
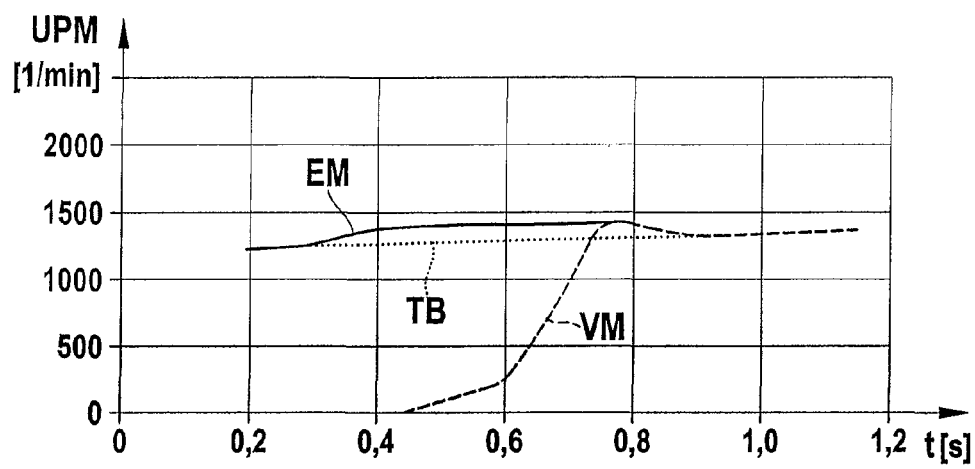
FIGS. 3A and 3B are speed and torque diagrams, respectively, for the variable occurring in a variation of the inventive method.
Figure 3B:
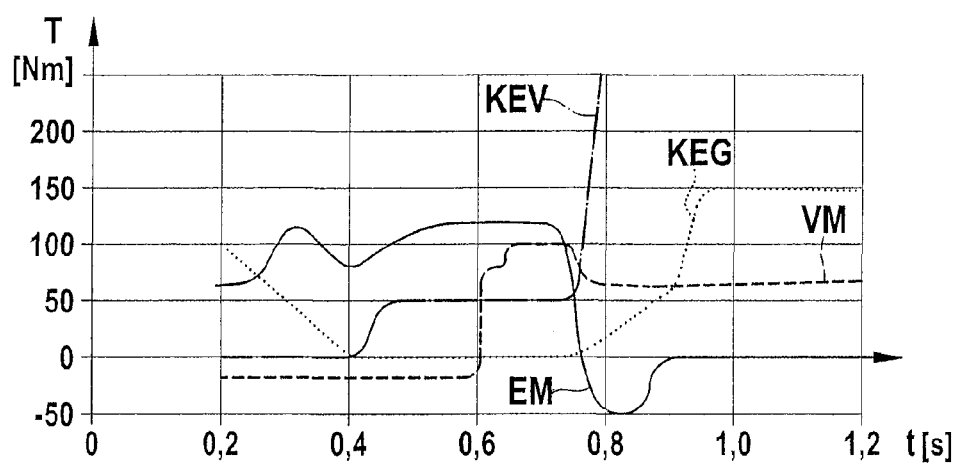

In FIGS. 3A and 3B the speeds VPM and the torques T are depicted as a function of time in the event that a gentle starting of the internal combustion engine 1 occurs without the speed overswinger. In this respect the same reference symbols and numerals are used as in FIGS. 2A and 2B.

In particular, FIG. 3A shows that the speed VM of the internal combustion engine 1 increases in the period of time ranging from 0.6 seconds to 0.8 seconds and is adjusted or controlled so that it reaches only the speed EM of the electric motor 3 without overshooting it.

FIG. 3B shows this as the result of the course of the curve for the coupling strength KEV of the clutch 2 between the electric motor 3 and the internal combustion engine 1. In the time period between approximately 0.45 seconds and 0.75 seconds, the torque KEV on this clutching device is constant; up to approximately 0.75 seconds the speed VM of the internal combustion engine 1 and the speed of the electric motor 3 agree. Thus, the present invention also permits a hybrid and/or switch-to mode, where the switching on and coupling together of the internal combustion engine 1 remains practically unnoticed.

Even though the present invention has been explained in detail with reference to the described embodiments, it is not limited thereto, but rather can be modified in a number of ways. The types of transmission and the types of torque converters that were mentioned by way of example may be modified in many ways. Furthermore, in addition to the measurement values that were mentioned by way of example and that the engine control unit receives, other parameters that characterize altogether the driving dynamics or the driving situation can be used. Even the simplified presentation of the torque converter can be modified.

What is claimed is:

1. A method for starting an internal combustion engine in a hybrid sports vehicle that is driven by an electric motor, comprising: providing a driver operable selector switch for selecting one of a gentle engine starting mode and a predetermined sports car engine noise mode; using an engine control unit to determine when driving dynamics require the internal combustion engine to supplement the electric motor; starting the internal combustion engine when the engine control unit determines driving dynamics require the internal combustion engine; adjusting a speed of the internal combustion engine to a target speed corresponding to a speed of the electric motor when the driver operable selector switch is in the gentle engine starting mode; adjusting the speed of the internal combustion engine to a sports car engine noise mode speed that exceeds the target speed of the internal combustion engine over a predetermined time by a predetermined speed differential while simultaneously decreasing a coupling strength of a clutch between the internal combustion engine and the electric motor when the driver operable selector switch is in the sports car engine noise mode for generating a speed overswing, and thereby producing a predetermined acoustical characteristic as a function of the speed overswing; and reducing the internal combustion engine speed to the target speed after a predetermined time of operating with the predetermined acoustical characteristic and then increasing the coupling strength of the clutch between the internal combustion engine and the electric motor.

2. The method claim 1, wherein the adjusting further comprises:
   (a) monitoring at least one start criterion for starting the internal combustion engine;
   (b) coupling the internal combustion engine to the electric motor; and
   (c) igniting the internal combustion engine.

3. The method of claim 1, wherein the speed differential is from 200 to 500 revolutions per minute.

4. The method of claim 3, wherein the predetermined time is in a range from 0.5 to 1 second.

5. The method of claim 1, further comprising suppressing a gear change of a transmission of the hybrid vehicle during switching to the internal combustion engine.

6. A method for starting an internal combustion engine in a hybrid sports vehicle that is driven by an electric motor, comprising:
   receiving measurement and control signals from components of the vehicle to determine driving dynamics;
   determining from the received measurement and control signals whether conditions require a starting of the internal combustion engine;
   determining whether a driver operable selector switch has been set to a sports car engine noise mode;

using the electric motor for starting the internal combustion engine when the measurement and control signals indicate driving dynamics requiring the internal combustion engine;

adjusting an operating speed of the internal combustion engine substantially to an operating speed of the electric motor when the driver operable selector switch has not been set to the sports car engine noise mode;

adjusting the operating speed of the internal combustion engine to a speed sufficiently in excess of the operating speed of the electric motor when the driver operable selector switch has been set to the sports car engine noise mode to produce a noise by the internal combustion engine that is acoustically different from a noise of the internal combustion engine while simultaneously decreasing a coupling strength of a clutch between the internal combustion engine and the electric motor when the driver operable selector switch has been set to the sports car engine noise mode; and reducing the operating speed of the internal combustion engine to a target speed substantially corresponding to the operating speed of the electric motor after a predetermined time and then increasing the coupling strength of the clutch between the internal combustion engine and the electric motor when the driver operable selector switch has been set to the sports car engine noise mode.

7. The method of claim 6, wherein the step of adjusting the operating speed of the internal combustion engine to a speed in excess of the operating speed of the electric motor comprises exceeding the speed of the electric motor by approximately one-third.

8. The method of claim 7 wherein the predetermined time period is in a range of 0.5 to 1 second.

9. The method of claim 6, wherein the step of adjusting the operating speed of the internal combustion engine to a speed in excess of the operating speed of the electric motor comprises exceeding the speed of the electric motor by a speed differential in a range of from 200 to 500 revolutions per minute.

10. The method of claim 9 wherein the predetermined time period is in a range of 0.5 to 1 second.

* * * * *